(12) United States Patent
Shifrin (10) Patent No.: US 7,435,886 B2
(45) Date of Patent: Oct. 14, 2008

(54) INTERVAL MODELS FOR THE MUSICAL OCTAVE

(76) Inventor: Eric A. Shifrin, 267 25th Ave., Apt. #2, San Francisco, CA (US) 94121

( * ) Notice: Subject to any disclaimer, the term of this patent is extended or adjusted under 35 U.S.C. 154(b) by 645 days.

(21) Appl. No.: 10/441,679

(22) Filed: May 20, 2003

(65) Prior Publication Data

US 2004/0231494 A1    Nov. 25, 2004

(51) Int. Cl.
*G10D 3/00* (2006.01)

(52) U.S. Cl. ...................................................... 84/313

(58) Field of Classification Search ............... 84/477 R, 84/478, 471 R, 470 R, 476
See application file for complete search history.

(56) References Cited

U.S. PATENT DOCUMENTS

| | | | | |
|---|---|---|---|---|
| 176,471 A | * | 4/1876 | Juch | 84/476 |
| 181,827 A | | 9/1876 | Eckhardt | |
| 1,619,683 A | | 3/1927 | Stinson | |
| 1,796,845 A | | 3/1931 | Jolls | |
| 2,287,138 A | * | 6/1942 | Sas | 84/410 |
| 2,864,275 A | * | 12/1958 | Fraleigh | 84/471 R |
| 3,375,748 A | * | 4/1968 | Aaron | 84/471 R |
| 4,069,735 A | * | 1/1978 | Bertram | 84/474 |
| 4,464,971 A | * | 8/1984 | Dean | 84/471 R |
| 4,736,665 A | * | 4/1988 | Sorribes Arambul | 84/471 R |
| 5,554,062 A | * | 9/1996 | Goldsen | 446/124 |
| 5,665,927 A | * | 9/1997 | Taki et al. | 84/609 |
| 5,949,010 A | | 9/1999 | Hacker | |
| 6,271,453 B1 | | 8/2001 | Hacker | |
| 6,967,274 B2 | * | 11/2005 | Hanington | 84/476 |

* cited by examiner

*Primary Examiner*—Kimberly R Lockett
(74) *Attorney, Agent, or Firm*—Gordon A. Shifrin

(57) ABSTRACT

This invention constitutes a set of devices that provides an approach to music instruction that is devoted particularly to demonstrating fundamental tonal properties of the musical octave. Novel shapes and sizes of both physical and virtual models are employed to represent these tonal properties in a vivid and graphical manner. Whether physical or virtual, each member of a given set of models is a portrayal that represents a particular amount of minimum tonal intervals of the musical octave. Physical models are in the form of blocks shaped to represent particular tonal intervals. Virtual models are images representing tonal intervals that are stored in computer memory and displayed on a computer screen. Assigned musical tones can be associated with individual displayed virtual images. Display and manipulation of these models (a) convey basic arithmetical or integral relationships of tonal intervals, (b) greatly enhance and stimulate both the understanding and the utilization of musical concepts, and (c) are entirely independent of conventional music notation.

3 Claims, 6 Drawing Sheets

INTERVAL MODELS FOR THE MUSICAL OCTAVE

FIELD OF THE INVENTION

The present invention relates to the area of musical instruction. Rather than being directed to general musical instruction, however, this invention is devoted particularly to a means for demonstrating fundamental tonal properties and characteristics of the musical octave. Included are such as musical structures such as intervals, scales, and chords. Through the use of models, both virtual and physical, which represent these characteristics, various essential features of the musical octave can be vividly displayed so as to bypass many pedagogical difficulties. An introduction to music is achieved that avoids some of the difficulty inherent in relying exclusively on conventional musical notation

OBJECTIVES OF THE INVENTION

The main objective of this invention is to generate a beginning instructional system that provides a novel approach to teaching and demonstrating essential features of the musical octave, such as musical intervals, scales, and chords. Another objective is to introduce models, both virtual and physical, that represent the tonal intervals that are smaller than (i.e. contained within) one musical octave. Such models can be manipulated to illustrate certain musical concepts in a palpable and instructive manner. It is a further objective of this invention to demonstrate clearly and distinctly the arithmetic or integral relationships of tonal intervals of the musical octave through the use of materials and devices entirely different from conventional musical notation. Such departure from conventional methods of musical instruction greatly stimulates the student's interest and encourages individual exploration. Some features of this invention could also provide a means to generate audible musical tones in real time. Additionally through the use of this invention, people incapable of playing existing musical instruments will be provided with the ability to generate sequences of audible tones and in this manner to compose music.

Typical musical instruction traditionally begins with the major scale, which has stylistically dominated music for centuries. Although the system proposed with this invention is fully capable of musical instruction with respect to the major scale, application of the system is not limited to the major scale. This scale is not forced upon the student. Rather, the harmonic implications of any scale can be clearly illustrated and explored, and thus experimentation is encouraged. Rapid facility with tonal intervals is vital to the craft of a skilled musician. Introducing models of these tonal intervals in the proposed novel manner greatly assists in the acquisition of this facility.

BACKGROUND OF THE INVENTION

Musical instruction has existed for as long as music itself. The cultural importance of music and its almost universal appeal explain the motivation for these historical efforts. In response to this need, many instructional approaches have been employed. Such approaches usually begin with the use of conventional music notation, and the focus is almost entirely on the major scale. Since conventional music notation is sometimes perceived to be obscure and forbidding to beginners, other approaches have been introduced.

Instruction relating to understanding the musical octave as a strictly chromatic entity is a more advanced topic, and thus is a greater challenge. But mastering this level of understanding is essential for competent modern musicians. Relatively few instructional approaches, however, have been directed strictly to the chromatic subdivision of the musical octave. For example, Slonimsky's "Thesaurus of Scales and Musical Patterns" is authoritative but is generally considered too demanding for most beginners. The fact that these prior efforts have met with only limited success is testimony to the pedagogical subtlety of this topic.

The present invention constitutes an advanced and novel procedure that transcends many of these pedagogical difficulties and meets particular instructional needs toward a deeper understanding the musical octave. It is directed to subject matter relating specifically to (a) the arithmetic relationships of intervals ranging from a single half-step or semitone to the full octave, and (b) the number or amount of half-steps contained in these intervals.

DESCRIPTION OF THE PRIOR ART

Many attempts have been made to generate devices and methods to teach music. These attempts are intended primarily to teach basic musical concepts. Further, such examples of the prior art that are identified below are not directed particularly toward teaching details of the musical octave. Typical instructional efforts and devices from the prior art can .be appreciated and understood from the following descriptions.

U.S. Pat. No. 181,827 issued to Eckhardt discloses a clef-block, a series of cubical, semi-cubical, and quarter blocks upon which are placed symbolic representations of different musical notes, characters, and signs. The blocks are of varying length to represent the duration of the notes, e.g. whole or half notes. Placing these blocs in a suitable pattern can represent a particular piece of music.

U.S. Pat. No. 1,619,683 issued to Stinson discloses physical models of musical notation for instructional purposes that are particularly intended for children. The invention employs a model of the conventional musical staff in the form of a solid elongated member provided with longitudinal bars that represent the lines of the staff. Physical representations of various musical notes and symbols are also provided with suitable hooks in a form that can be attached to the bars (i.e. lines) of the staff. In this manner a musical piece can be represented mechanically.

U.S. Pat. No. 1,796,845 issued to Jolls discloses an apparatus for teaching music employing mechanical models of musical scales and intervals representing the duration of various notes. An embodiment of the invention contains rack like devices that are notched in a manner that represents whole tones and semitones of the diatonic scale. In addition, a group of blocks, each of which represents a musical pitch, is also disclosed. When these blocks are placed in proper consecutive order, they indicate a chromatic scale. Designations of the various pitches are placed on the reverse faces of these blocks.

U.S. Pat. No. 5,949,010 and U.S. Pat. No. 6,271,453 B1 issued to Hacker disclose an apparatus for musical education in the form of a toy or game. Certain features of the invention are intended to strongly hold the attention of both children and adults regardless of their musical ability. It features auditory feedback associated with particular piano keys so that a particular song can be played and also can function as an aid to musical composition. Musical blocks are employed whose sides carry visual representations of musical indicia such as notes of various durations plus alphabetical representations of these notes. Other features include representations of musical instruments and such musical symbols as sharps and flats.

A unique color represents each of the seven notes from A to G. Blocks may contain an internal reed that is tuned to the indicated note and a hole through which air can flow to activate the reed.

As mentioned above, these examples from the prior art are intended to teach basic musical concepts. These systems and devices do not appear to be intended particularly to teach or illustrate essential technical details of the intervals of the musical octave.

BRIEF DESCRIPTION OF THE INVENTION

This invention provides a set of interrelated models intended to illustrate fundamental characteristics and properties of the musical octave. Each member of the set of models is a portrayal that represents a particular sum or number of minimum tonal intervals of the musical octave. This minimum tonal interval will henceforth be designated as MTI. In other terms, each member of the set of models portrays a different and distinct tonal interval of the musical octave. These tonal intervals are formed using various sums of semitones or half steps that are the smallest subdivisions of one octave. When these semitones are ordered in the full and proper sequence, they complete the octave and form the chromatic scale. It is important to note that the models disclosed in this invention represent tonal intervals on a fundamental level and are entirely independent of the conventional musical staff. This invention provides a particularly valuable visualization of these musical intervals that is free from conventional musical notation.

Combining and arranging these models can produce graphical representations of many musical situations. Because these models can be deliberately and arbitrarily manipulated and arranged in patterns or arrays that illustrate basic tonal relationships, their use greatly facilitates both the teaching and the understanding of musical fundamentals. These sets of models can be articulated into two general embodiments: (a) physical models, typically in the form of blocks and (b) similar virtual models displayed on a screen. Both embodiments, however, follow from the same general concept. Each member of any particular set of models has a shape and a critical dimensional element that in combination (a) distinguish it from other members of the set and (b) facilitate and illustrate its particular role and function with respect to the musical octave. Each member of the set can have a distinctive color to further distinguish it from other members of the set. The critical dimensional element will always be a multiple of a standard unit of length, henceforth designated as SU.

BRIEF DESCRIPTION OF THE DRAWINGS

FIGS. 17a through 27b illustrate a set of interrelated models in the form of blocks that are physical embodiments of the set of models illustrated in FIGS. 1 through 7 and FIGS. 10 through 13.

FIGS. 17a and 17b illustrate a block that is a physical embodiment of the 1 SU model shown in FIG. 1. FIGS. 18a and 18b illustrate a block that is a physical embodiment of the 2 SU model shown in FIG. 2. FIGS. 19a and 19b illustrate a block that is a physical embodiment of the 3 SU model shown in FIG. 3. FIGS. 20a and 20b illustrate a block that is a physical embodiment of the 4 SU model shown in FIG. 4. FIGS. 21a and 21b illustrate a block that is a physical embodiment of the 5 SU model shown in FIG. 5. FIGS. 22a and 22b illustrate a block that is a physical embodiment of the 6 SU model shown in FIG. 6. FIGS. 23a and 23b illustrate a block that is a physical embodiment of the 7 SU model shown in FIG. 7.

FIGS. 27a and 27b illustrate a block that is a physical embodiment of the 11 SU model shown in FIG. 13.

DETAILED DESCRIPTION OF THE INVENTION

This invention is intended for instruction based on fundamental characteristics of the musical octave. Note that any tonal interval of the octave is a combination or sum of a particular number of minimum tonal intervals. When these semitones are ordered in the full and proper sequence, they complete the octave and form the chromatic scale. It is important to note that these models represent only tonal intervals on a fundamental level and are entirely independent of the conventional musical staff. Thus they are intended to illustrate interval relationships within the octave itself, not the musical cleff and musical staff or the features of any musical instrument. With this invention, a set of interrelated models is proposed in which each member of the set of models is a portrayal that represents a particular sum of minimum tonal intervals of the musical octave. Further, each model represents both the size (or the musical range) of a particular tonal interval plus its relationship to other parts of the octave. Through the manipulation of these tonal intervals and by employing these models that represent them, any chord or scale can be generated and illustrated.

With this invention, these tonal intervals (i.e. those contained within one musical octave) are illustrated and introduced in a novel manner. This result is produced through the use of a set of interrelated models such that each member of the set of models portrays and represents a different and distinct tonal interval of the musical octave. Each member of the set is distinguished from other members of the set by its particular shape. Further, the shape of each member of the set suggests and illustrates a particular tonal interval within the musical octave. Each member of the set is distinguished from other members of the set by the length of at least one critical dimensional element that is a multiple of a specified standard unit of length. This common element of the standard unit of length throughout the set of models provides the interrelationship among all members of the set and makes the set into a unified group. This specified standard unit of length, when employed with actual models, corresponds to and represents the minimum tonal interval or one half step within the musical octave.

As an additional aid to identification, each member of the set can have an associated color to further distinguish it from other members of the set. Colors can be used to clearly differentiate intervals that are close in size. For example, a minor second model can be black, a major second model can be white, a minor third model can be blue, and a major third model can be red, and so on.

The musical octave consists of twelve individual semitones or half steps. These semitones or half steps have been referred to above as minimum tonal intervals. Groups of MTI can be combined or added together to form a complete octave or any interval or segment of the octave. For example, a full octave is formed by beginning at any tone, and ending at the equivalent tone that is displaced from the beginning tone by twelve MTI. Notes at either end of an octave are called by the same name, although their frequencies differ by a factor of two. These twelve MTI, either individually or in combination, can create any possible scale, chord, or chord voicing.

By employing certain combinations of MTI, some important corresponding mathematical representations can be portrayed. Examples of these representations are 12×1, 6×2, 4×3, and 3×4. Thus in other terms, the basic musical octave can be constructed or formulated employing twelve MTI or tones, six whole tones, four minor thirds, or three major thirds. These quantities and their representations can be shown and clearly illustrated by employing typical arrangements of models that represent various combinations of MTI.

Clearly, the possible shapes and characteristics of tonal models that fall within this functional description are essentially unlimited. In this disclosure, a set of models will be introduced that is a typical and representative embodiment that fits the above functional description. Although these preferred shapes are highly suggestive of their musical function, such a specific introduction, however, is used for illustrative purposes without any intent or purpose of limiting or restricting the basic concept of this invention to any particular set or group of such shapes.

The critical dimensional element, as described above, will be measured in terms of multiples of a specified standard unit of length. The specified standard unit of length corresponds to and represents the minimum tonal interval within the musical octave. It is, however, important to distinguish between the graphical SU and the musical MTI. In other words, an SU in a particular model corresponds to and represents a graphical portrayal of an MTI within the musical octave. For the physical embodiment, the SU is a physical length. For the virtual embodiment the SU functions as a relative graphical length, because the absolute length is less important. In either case, multiples of that standard unit of length are expressed in some critical dimensional element on each model throughout a particular set of models.

These arrays are graphically independent of conventional musical notation. In spite of this feature of independence, however, ultimately the fundamental and essential relationship of the models to conventional musical concepts and conventional notation is neither lost nor compromised.

Consider first that embodiment of the invention in which members of the set are physical models. Each member of the set is a physical portrayal and embodiment of a particular sum of minimum tonal intervals within the musical octave. The set of models is such that each member of the set is a physical block. These blocks can be of any thickness, but three particular forms represent preferred embodiments. In one form each member of the set is a physical block that is essentially thin and flat. In a second form, each member of the set is a physical block whose thickness is essentially one half SU. In the third form the cross-section of each member of the set is essentially a semi-circle.

Each block or member of the set has a particular shape. The shape of each member of the set suggests and represents its tonal interval within the musical octave. That shape also illustrates the musical range or contribution of the model to the tonal interval that it represents. Further, each block is designed to have at least one critical dimensional element whose length is a multiple of a standard unit of length (one SU). In this manner for the physical embodiment, the range of space occupied by any block physically corresponds to and represents the tonal range measured in a number of minimum tonal intervals (MTI) embodied in that block. Each block typically can have a distinctive color to further distinguish it from other members of the particular set of physical models as described below. Further to work with the board that will be described below, each member of the set of physical models (a) is made of magnetic material, or (b) is provided with a magnetic layer means. In this manner, their utility is enhanced, because the blocks would adhere to the board when placed upon it.

Placing physical models and arranging them to form an array can be assisted with the use of a board that is laid out with orthogonal lines that form a grid of squares. This board is laid out with orthogonal lines for which both the vertical and horizontal sides of each square of the grid represent and correspond to one specified standard unit of length. An additional feature can be added to the board to work with the magnetic blocks described above. The board (a) is made of a magnetic material or (b) is provided with a magnetic layer means. As will be described below, virtual models can be arranged and displayed on a virtual grid to form arrays without the need for such a physical aid in the form of a board.

The value and utility of the above properties for the set of blocks as physical models is that tonal relationships representative of and derived from the musical octave can be constructed, arranged, and manipulated as physical arrays and in an arbitrary manner. Further, since the resulting arrays are both tactile and vividly graphical, the instructional power of the blocks is greatly enhanced.

In this invention, all of the features disclosed are interrelated. Thus, the form of the basic set of models, the blocks that embody these forms, and the board laid out with grid lines to assist in forming arrays constitute a unified group of elements. The unifying feature throughout this group that all elements share is the specified standard unit of length. This standard unit of length corresponds to and represents a minimum tonal interval of the musical octave. These features involve only tonal intervals within the octave and are entirely independent of conventional musical notation.

Consider now the embodiment of this invention in which members of the set of models are virtual images. Each member of the set of models is a virtual portrayal that represents a particular sum of minimum tonal intervals within the musical octave. This virtual embodiment of the invention provides for the display of a set of images such that each member of the set has a graphical shape that (without regard to thickness) can be similar and essentially equivalent to that described for the set of physical models. The characteristics of each member of the set of virtual images will consist of a specified two-dimensional shape, will employ a critical dimensional element, and can be provided with a distinctive color in a manner similar to those characteristics described above for physical models.

A suitable computer program means controls each member of the set of stored virtual models. The models can be arranged and manipulated so as to display arrays in a manner similar to that described for physical models. Thus the use of the computer program means provides essentially the same instructional advantages described previously for the physical models. Each member of the set of virtual models is a graphical image stored in a computer memory means. The computer program means controls each member of the set of stored images. Under control of the computer program means, individual members of the set of stored virtual images are accessed.

Under control of the computer program means, copies of individual members of the set of stored virtual images are displayed on a computer screen means. Under control of the computer program means copies of individual members of the set of stored virtual images are arranged on a computer screen in any arbitrary configuration. Although the relative sizes of members within the set described above can be maintained, the absolute size of the SU for a virtual set of models is flexible so as to accommodate the particular needs and limitations of the computer display means.

The computer program means produces audible musical tones by controlling an audio oscillator means. The computer program means assigns these musical tones to individual members of the set of stored virtual images. Under control of the computer program means, the assigned musical tones are generated on command in association with displayed individual members of the set of stored virtual images. This feature further enhances the practical and pedagogical value for the use of the virtual models.

Additional advantages of having these virtual models displayed on a screen under the control of a suitable computer program means include enhanced flexibility, memory, and speed. There is no practical limit to the number and arrangement of images from an established set of virtual models that can be introduced and displayed so as to generate any array or pattern. This feature permits essentially unlimited complexity with respect to forming and displaying arrays.

Some typical arrangements and arrays of models will illustrate how they can be employed for musical instruction. A horizontal (or linear) array of these models in a sequence can represent any musical scale or set of musical tones. Further, by introducing a vertical aspect to an array of models, any harmonic arrangement (or chord voicing) can be represented. Combining both horizontal and vertical aspects to an array, and in addition employing their inherent proportionality, will allow any scale to be harmonized. This important feature of the invention will be described below.

A typical and representative set of models consistent with the requirements given above will now be described. This set is a preferred embodiment, but it is not intended to exclude any other equivalent sets that meet the essential requirements described above. The set of models will consist of a group of members in which each member of that set represents and illustrates a particular tonal interval of the musical octave. The following descriptions can apply essentially equivalently to both virtual and physical embodiments.

A preferred embodiment for one suggested set of interrelated models is illustrated in the following figures. A standard unit of length (SU), or some multiple of SU, will be employed throughout the set of models as a critical dimensional element for various members of this set of models. In this manner, the entire set of models becomes a unified group related through the common use of multiples of the same standard unit of length. Any equivalent set of models will likewise employ a standard unit of length or some multiple of the SU.

Figures 1, 2, 3, 4, 5:
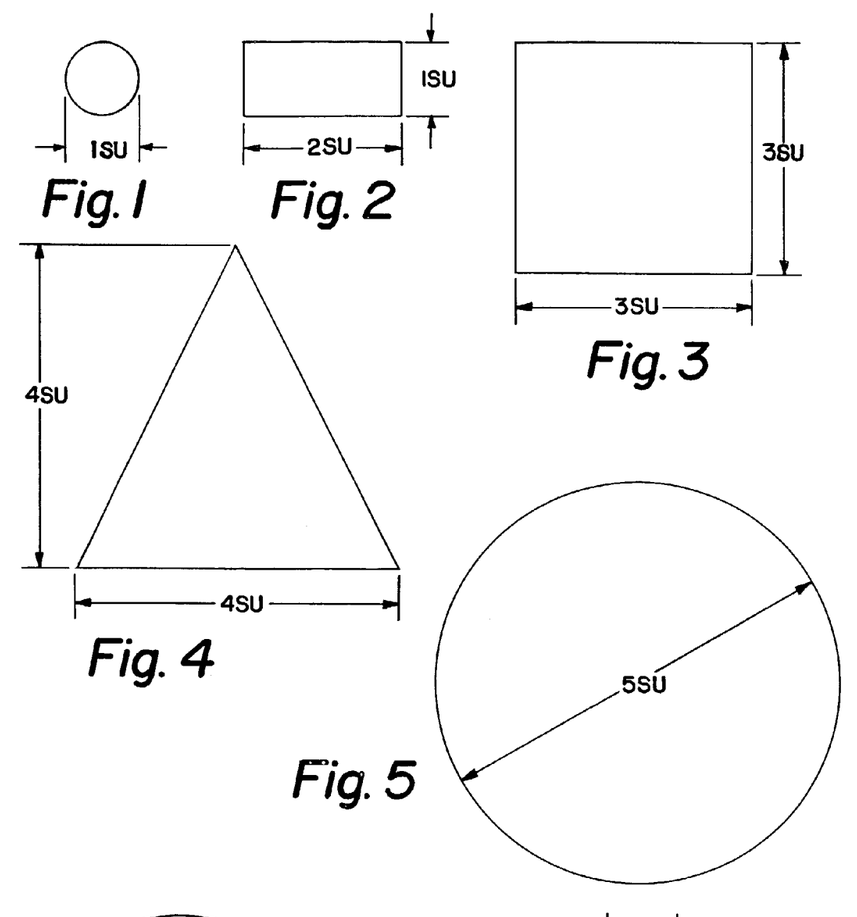
FIG. 1 shows a circle whose diameter is one SU. It represents one MTI of the octave and is also called a half-step or semitone.
FIG. 2 is rectangle whose length is two SU and whose width is one SU. It represents two MTI of the octave and is also called a whole step or whole tone.
FIG. 3 is a square; the length of each side is three SU. It represents three MTI of the octave and is also called a minor third or sesquitone.
FIG. 4 is a triangle, the length of whose base is four SU and the length of whose height is also four SU. It represents four MTI of the octave and is also called a major third or ditone.
FIG. 5 is a circle whose diameter is five SU. It represents five MTI of the octave and is also called a perfect fourth.

FIG. 1 shows a circle whose diameter is one SU. This model represents in graphical form a semitone, a minor second, or one MTI. One SU is one twelfth of the length of the graphical representation of the full octave. Thus alternatively, it divides this representation of the octave into twelve equal parts.

FIG. 2 shows a rectangle whose length is two SU and whose width is one SU. This model represents a whole tone or a major second. Its length is one sixth of the length of the graphical representation of a full octave. Thus alternatively, it divides the representation of the octave into six equal parts.

FIG. 3 shows a square, wherein the length of each side is three SU. It represents a sesquitone or a minor third. A minor third can be specified symbolically as m3. This length is one fourth of the length of the graphical representation of a full octave. Thus alternatively, it divides the representation of the octave into four equal parts. The minor third could be said to "square" the octave.

FIG. 4 shows a triangle, the length of whose base is four SU, and the length of whose height is also four SU. It represents a ditone or a major third. A major third can be represented symbolically as M3. This length is one-third the length of the graphical representation of the full octave. Thus alternatively, this triangle divides the representation of the octave into three equal parts. The minor third could be said to "triangulate" the octave. The minor third and the major third are basic harmonic or chordal elements.

FIG. 5 shows a circle whose diameter is five SU. It is a representation of the perfect fourth of the octave. The circle invokes the concept of the "circle of fourths."

Figures 6, 7:
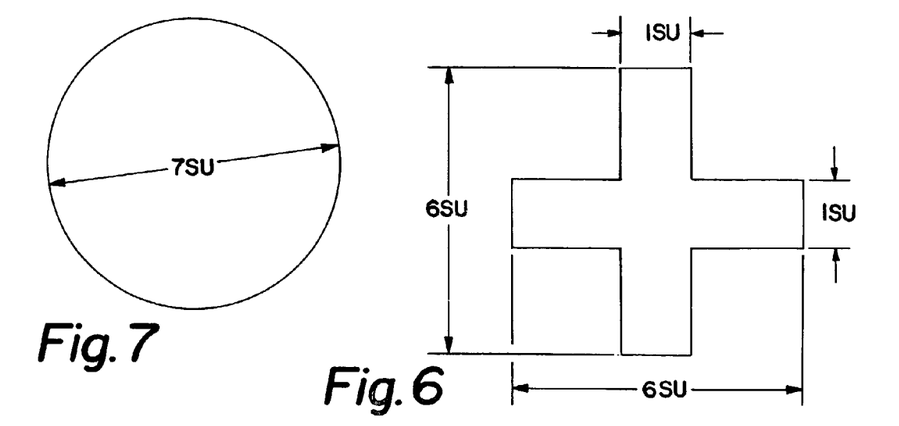
FIG. 6 is a cross. The full length of each arm of the cross is six SU. The width of each arm of the cross is one SU. It represents six MTI of the octave and is also called a tritone.
FIG. 7 is a circle whose diameter is seven SU. It represents seven MTI of the octave and is the inversion of the circle illustrated in FIG. 5. It is also called a perfect fifth.

FIG. 6 shows a cross or a plus sign. The full length of each leg of the cross (from tip to tip) is six SU, and the width of each leg is one SU. This model is a representation of a tritone within the octave. The full length of each arm corresponds to one half of the length of the graphical representation of a full musical octave. Thus alternatively, the cross represents dividing the octave into two equal parts.

FIG. 7 is a circle with a diameter of seven SU. It represents the inversion of the circle of fifths model illustrated in FIG. 5.

Figure 8:
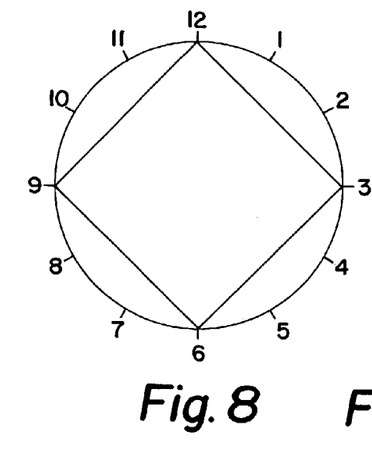
FIG. 8 illustrates the clock face analogy of the octave as it applies to the minor third of the octave and to the square illustrated in FIG. 3.
Figure 9:
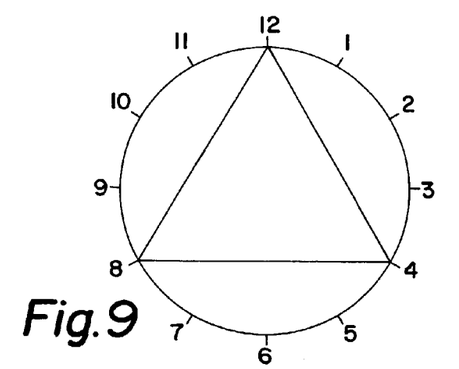
FIG. 9 illustrates the clock face analogy of the octave as it can be applied to a major third of the octave. In the actual model, a triangle with its height equal to its base (See FIG. 4) is required over the equilateral triangle shown.

A rationale for the selected shapes of the models for the minor third (FIG. 3) and the major third (FIG. 4) can be understood by the clock face analogy, which also illustrates many properties of the octave. FIG. 8 shows a circle divided into twelve parts and numbered so as to suggest a clock face. The twelve numbers on the clock face correspond to the twelve MTI in the full octave. Note that the numbers 12 and 0 at the top of the circle are synonymous. An inscribed square intersects the circle at four points; each side of the square spans three numbers (3 MTI). This illustrates that the octave can be represented by four minor thirds and that the square is a suitable representation. FIG. 9 shows a circle similar to that in FIG. 8. As in FIG. 8 the numbers 12 and 0 are synonymous. An inscribed equilateral triangle intersects the circle at three points; each side of the triangle spans four numbers (4 MTI). This illustrates that the octave can be represented by three major thirds and that a triangle is a suitable representation. The preferred model of a major third, however, is a triangle the length of whose base is four SU and the length of whose height is also four SU such as is provided in FIG. 4. The utility of this feature is that both the height and the width of the model can be four SU. Thus the vertical dimensional element of the model can then be easily integrated into the vertical axis of an array.

The primary models representing the musical range from one MTI to six MTI are supplemented by a series of larger intervals that closely reflect the first set. This second group represents the so-called "inversions" of the primary set. An inversion is the supplemental interval that in combination with a primary interval serves to complete the octave. In other terms, for any given primary interval, its inversion is that interval which when added to the primary interval completes the tonal span of one octave. A simple formula for the MTI of an inversion is 12 MTI minus the MTI associated with the primary interval. For example, the inversion of the tritone (the cross in FIG. 6 with six MTI) is another tritone, so that their combined tonal span is twelve MTI. For another example, the inversion of the major third (the triangle of FIG. 4 with four MTI) is a double triangle (see FIG. 10) so that their combined tonal span is also twelve MTI. The shapes of models of supplemental (i.e. larger) intervals reflect and complement their primary mate. The following figures illustrate a preferred embodiment of a set of models representing the range of intervals larger than six MTI; these are inversions of the intervals that are six MTI or less. In general, these models will apply equivalently to both physical and virtual embodiments.

Figure 10:
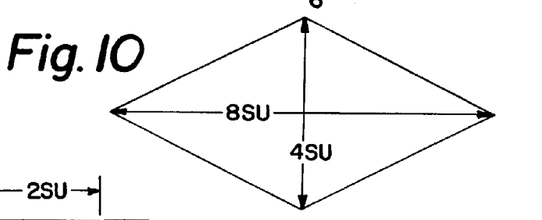
FIG. 10 is a diamond. The length of its shorter axis is four SU, and the length of its longer axis is eight SU. It represents eight MTI of the octave. It is the inversion of the triangle illustrated in FIG. 4 and is also called a minor sixth.

FIG. 10 is a diamond wherein the shorter axis is four SU and the longer axis is eight SU. It corresponds to the inversion of the triangle model illustrated in FIG. 4 that represents a ditone or a major third.

Figure 11:
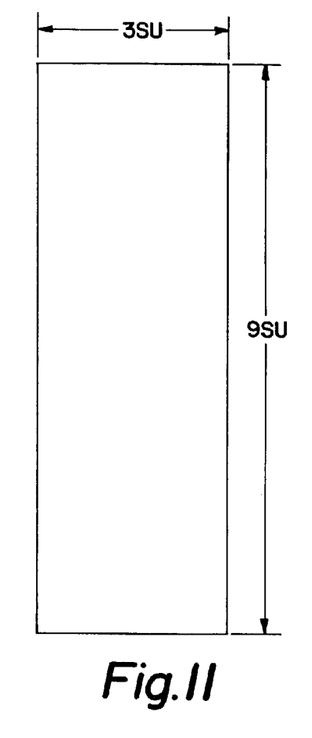
FIG. 11 is a rectangle whose length is nine SU and whose width is three SU. It represents nine MTI of the octave and is the inversion of the square that is illustrated in FIG. 3. It is also called a major sixth.

FIG. 11 is a long rectangle whose length is nine SU and whose width is three SU. It corresponds to the inversion of the square illustrated in FIG. 3 that represents a sesquitone or a minor third.

Figure 12:
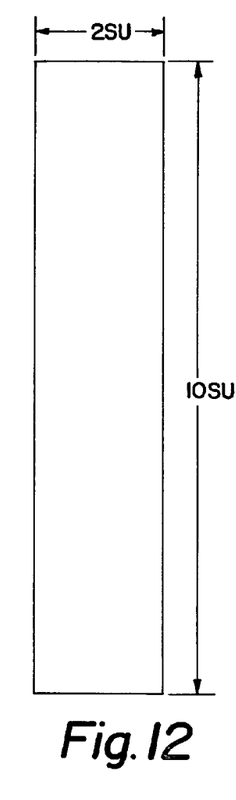
FIG. 12 is a long rectangle whose length is ten SU and whose width is two SU. It represents ten MTI of the octave and is the inversion of the rectangle that is illustrated in FIG. 2. It is also called a minor seventh.

FIG. 12 is a long rectangle whose length is ten SU and whose width is two SU. It corresponds to the inversion of the rectangle model illustrated in FIG. 2 that represents a whole tone or a major second.

Figure 13:
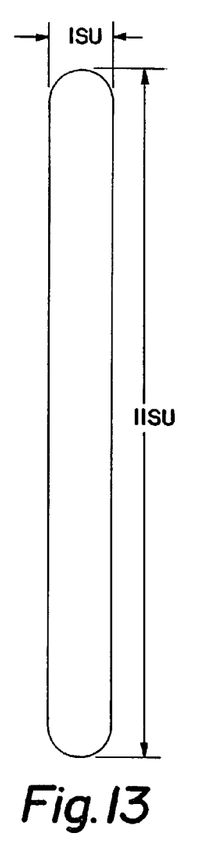
FIG. 13 is a long rectangle whose length is eleven SU and whose width is one SU. It represents eleven MTI of the octave. It is the inversion of the circle that is illustrated in FIG. 1. The ends of this model are rounded to a radius of essentially one half SU.

FIG. 13 is a long rectangle whose length is eleven SU, whose width is one SU, and whose ends are rounded with a radius of essentially one half SU. It corresponds to the inversion of the circle illustrated in FIG. 1 that represents a semitone or a minor second.

Figures 14, 15:
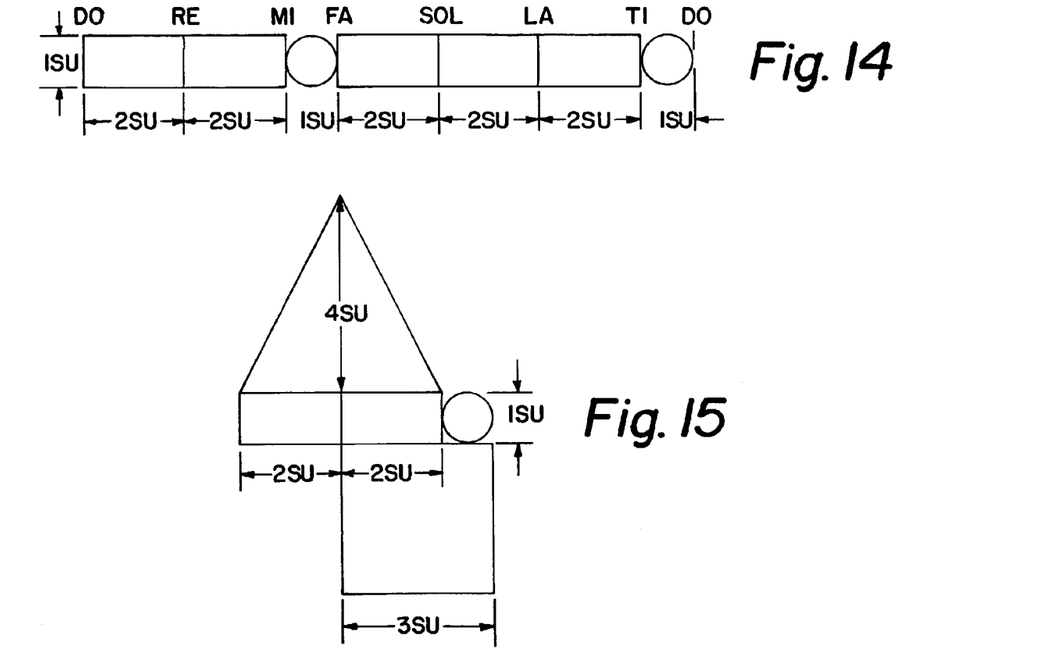
FIG. 14 is an array employing a group of certain models that illustrates the major scale.
FIG. 15 is an array employing a group of certain models that illustrates the method of extracting thirds from seconds.

The array of models shown in FIG. 14 illustrates the major scale as formed with the first two models from the set (those illustrated in FIGS. 1 and 2). The overall length of this array is twelve SU. The familiar vocal representations of the scale, Do, Re, Mi, etc are indicated.

The array of models shown in FIG. 15 represents the first step in the harmonization of a scale fragment or turning seconds into thirds. Elements in the horizontal axis in FIG. 15 represent the first three notes of a major scale. The triangle (critical dimensional element 4SU) incorporates the first two steps of a major scale to form a major third. The square (3SU) corresponds to a whole step plus one MTI. It incorporates the second and third notes of a major scale to form a minor third. Both sides (top and bottom) of the scale (the center array exclusively seconds) must be used to address each degree of the scale.

An advanced topic that is employed to particular advantage with this invention, involves harmonizing scales. This process expands a scale into a structure of thirds or a two-octave span. A scale constitutes seconds (or MTI) and whole steps that total one octave or twelve MTI. A group of chords is created which directly reflects the character of the scale.

Figure 16:
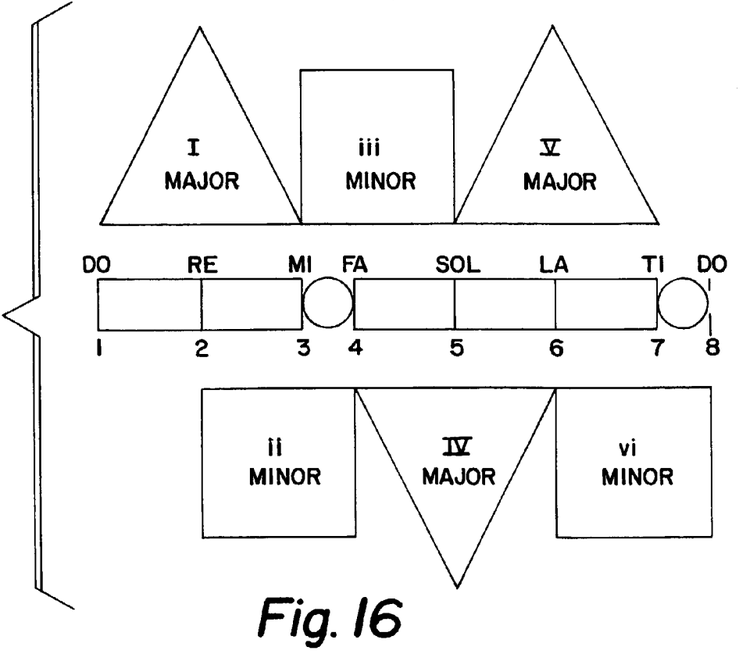
FIG. 16 is an array employing a group of certain models that illustrates the harmonization of the major scale.

The array of models shown in FIG. 16 represents the harmonization of the major scale. It also illustrates the chordal qualities of the first six degrees of the scale including three major and three minor chords. Once the thirds are extracted from the scale, they can be arranged vertically to create chords. The Roman numerals indicate the scale step that serves as the root of the chord being constructed. The figure is shown as three rows of models with two spaces separating the rows. The spaces are included in the figure only for clarity and to provide space for essential notation. In actual use, these spaces would not be employed.

Major and minor triads in the root position are the most elementary of chords and are the first harmonic structures that a beginning music student learns. These structures employ the same two intervals but in a different order. In FIG. 16, the two intervals are (a) a triangle (4 MTI) representing a major third and (b) a square (3 MTI) representing a minor third. Both major and minor structures span a total of seven MTI, but the lower interval (the third on the bottom, or the figure to the left) determines the chord quality. There are six scale step chords represented in FIG. 16, but only two different structures: major and minor. Chords can be represented in two ways. First, with the triangle to the left, the chord is determined to be a major and will be designated with upper case numerals (I, IV, V). Second, with the square to the left, the chord is determined to be minor and will be designated with lower case numerals (ii, iii, vi).

In addition to inversion, the following basic musical structures are easily created and visualized by employing the prescribed set of models: These are all collections of combinations of MTI adding up to twelve MTI: (1) the chromatic scale (twelve MTI); (2) all diatonic scales. The major scale is an example; (3) the whole tone scale. (six whole steps); (4) all triads in every inversion.

FIGS. 17a through 27b illustrate a set of interrelated models in the form of blocks that conform to and represent in physical form the basic set of models shown above in FIGS. 1 through 7 and in FIGS. 10 through 13. The thickness of each member of this set of blocks is shown as an arbitrary value of A. A typical value for thickness A is one half SU as indicated in this group of figures. For every block shown in these figures, each dimension is indicated as a certain number of SU and corresponds to and represents the same number of MTI.

Figures 17A, 17B, 18A, 18B, 19A, 19B, 20A, 20B, 21A, 21B, 22A, 22B, 23A, 23B:
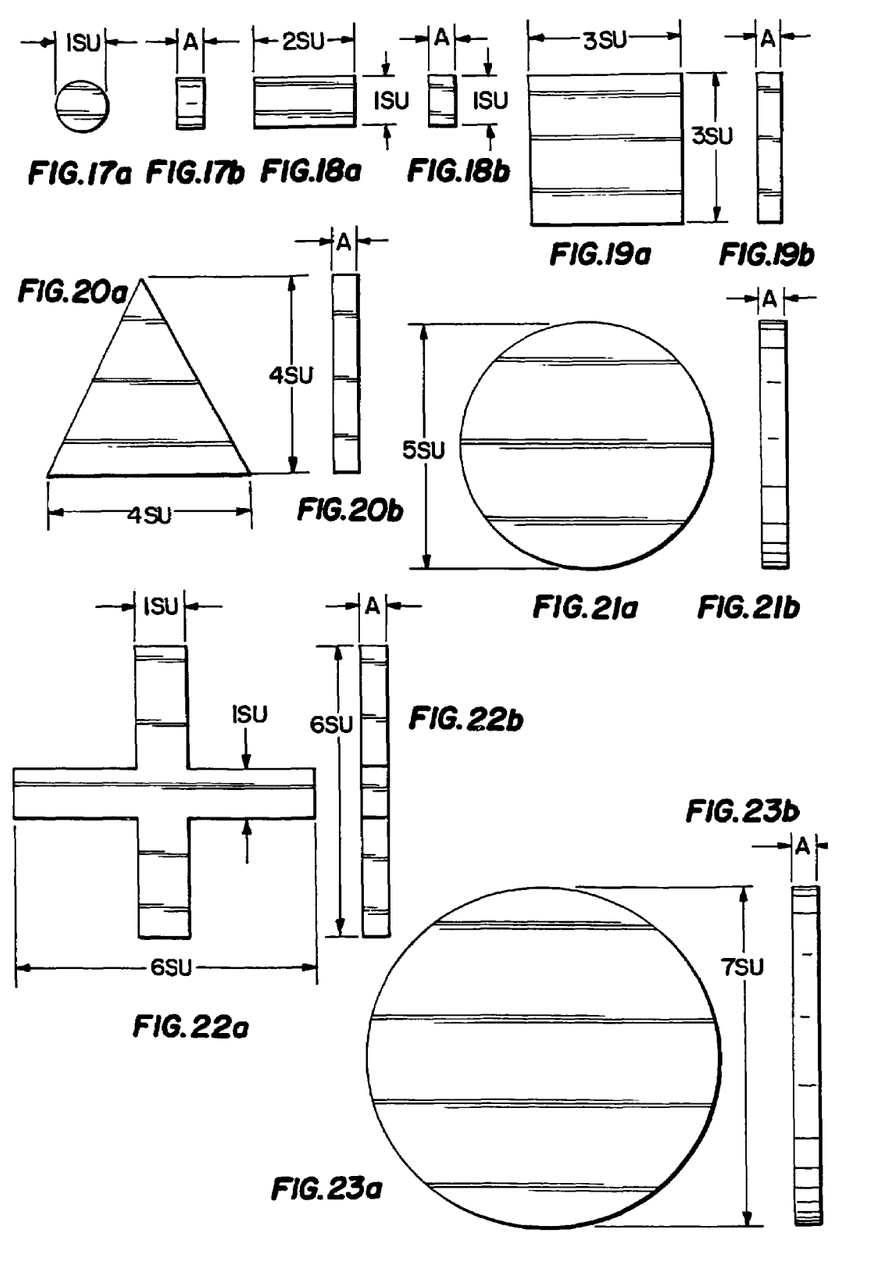

FIGS. 17a and 17b illustrate a block in the form of a circle with a diameter of one SU. It is an embodiment of the model of FIG. 1. This block represents in physical form a semitone or one MTI.

FIGS. 18a and 18b illustrate a block in the form of a rectangle whose width is one SU and whose length is two SU. It is an embodiment of the model of FIG. 2. This block represents in physical form a whole tone or a major second.

FIGS. 19a and 19b illustrate a block in the form of a square wherein the length of each side is three SU. It is an embodiment of the model of FIG. 3. This block represents in physical form a sesquitone or a minor third.

FIGS. 20a and 20b illustrate a block in the form of a triangle, the length of whose base is four SU, and the length of whose height is also four SU. It is an embodiment of the model of FIG. 4. This block represents in physical form a ditone or a major third.

FIGS. 21a and 21b illustrate a block in the form of a circle whose diameter is five SU. It is an embodiment of the model of FIG. 5. This block represents in physical form a perfect fourth of the octave.

FIGS. 22a and 22b illustrate a block in the form of cross or a plus sign. The full length of each leg of the cross (from tip to tip) is six SU, and the width of each leg is one SU. It is an embodiment of the model of FIG. 6. This block is a represents in physical form a tritone within the octave.

FIGS. 23a and 23b illustrate a block in the form of a circle with a diameter of seven SU. It is an embodiment of the model of FIG. 7. This block represents in physical form the inversion of the circle of fifths.

Figure 24A:
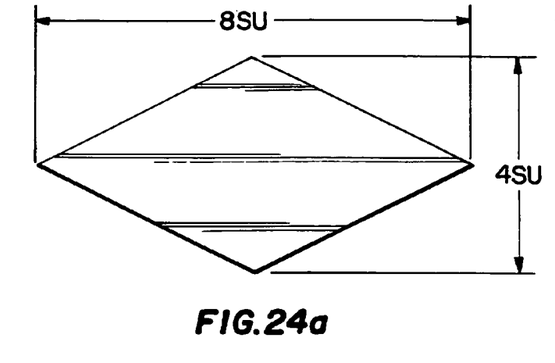
FIGS. 24a and 24b illustrate a block that is a physical embodiment of the 8 SU model shown in FIG. 10.
Figure 24B:
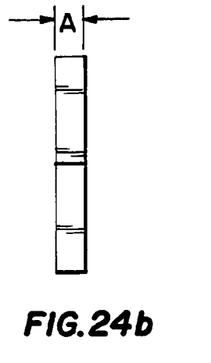

FIGS. 24a and 24b illustrate a block in the form of a diamond wherein the shorter axis is four SU and the longer axis is eight SU. It is an embodiment of the model of FIG. 10. This block represents in physical form the inversion of the triangle model illustrated in FIG. 4 that in turn represents a ditone or a major third.

Figure 25A:
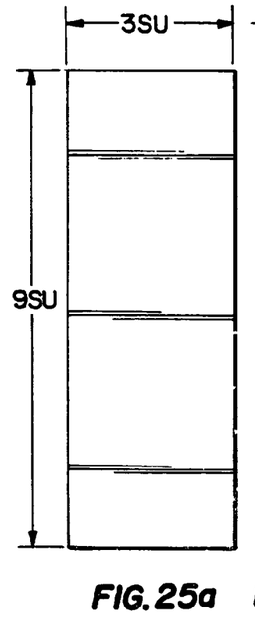
FIGS. 25a and 25b illustrate a block that is a physical embodiment of the 9 SU model shown in FIG. 11.
Figures 25B, 26A, 26B:
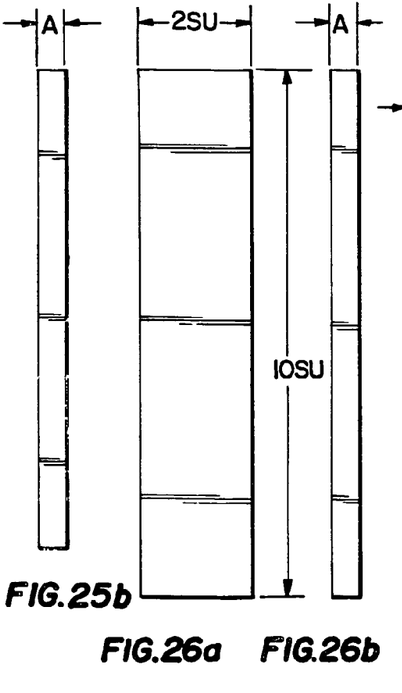
FIGS. 26a and 26b illustrate a block that is a physical embodiment of the 10 SU model shown in FIG. 12.

FIGS. 25a and 25b illustrate a block in the form of a long rectangle whose length is nine SU and whose width is three SU. It is an embodiment of the model of FIG. 11. This block represents in physical form the inversion of the square illustrated in FIG. 3 that in turn represents a sesquitone or a minor third.

FIGS. 26a and 26b illustrate a block in the form of a long rectangle whose length is ten SU and whose width is two SU. It is an embodiment of the model of FIG. 12. This block represents in physical form the inversion of the rectangle illustrated in FIG. 2 that in turn represents a whole tone or a major second.

Figures 27A, 27B:
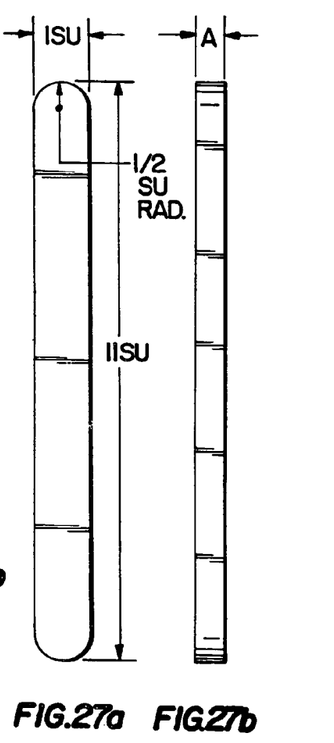

FIGS. 27a and 27b illustrate a block in the form of a long rectangle whose length is eleven SU, whose width is one SU, and whose ends are rounded with a radius of essentially one half SU. It is an embodiment of the model of FIG. 13. This block represents in physical form the inversion of the model illustrated in FIG. 1 that in turn represents a semitone or a minor second.

Figures 28A, 28B:
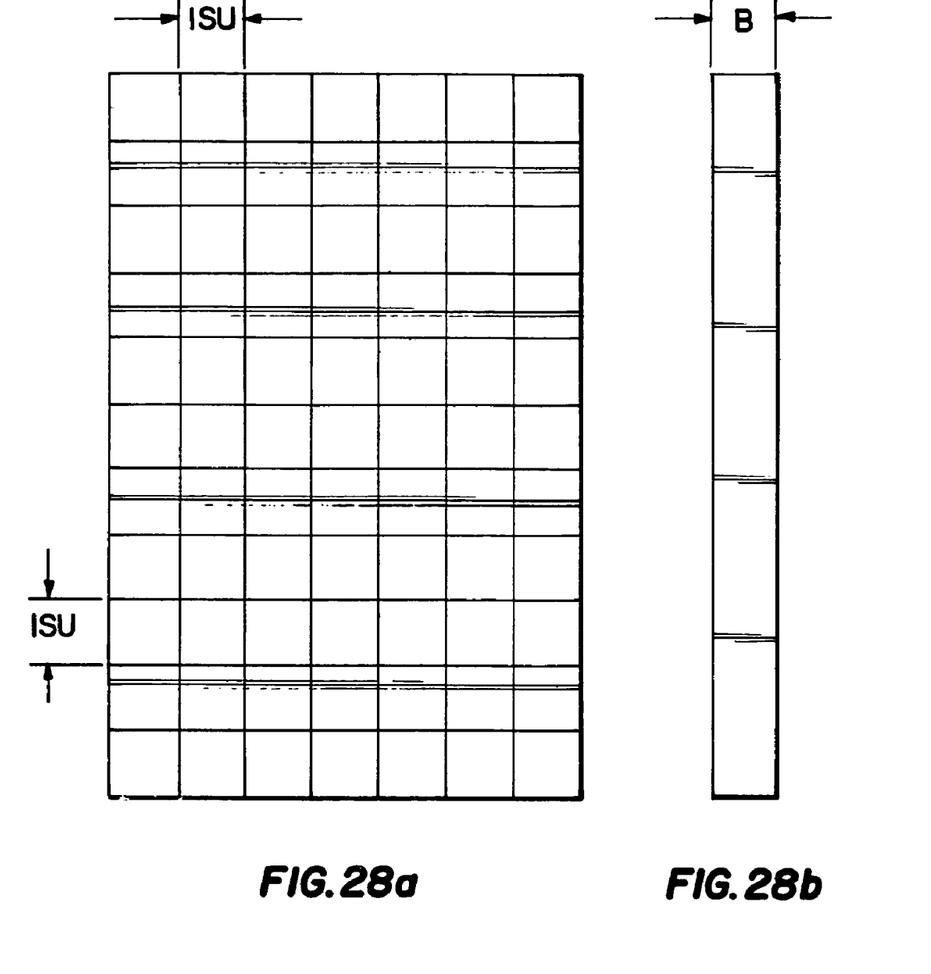
FIGS. 28a and 28b illustrate a board laid out with orthogonal lines that form a grid of squares in which the sides of each square of the grid represent and correspond to one SU.

FIGS. 28a and 28b illustrate a board laid out with orthogonal lines that form a grid of squares such that both the vertical and horizontal sides of each square have a length of one SU. A representative thickness for this board is indicated by the letter B. This board is useful to lay out groups of individual models to form any arbitrary array.

What is claimed is:

1. A set of interrelated models in which each member of said set of models is a physical block that portrays and represents a particular sum of minimum tonal intervals of the musical octave:
    (a) Said each member of said set of models represents a different and distinct said tonal interval of said musical octave;
    (b) Said each member of said set of models is distinguished from other members of said set of models by its particular shape;
    (c) Said each member of said set of models is distinguished from other members of the said set of models by the length of at least one critical dimensional element that is a multiple of a specified standard unit of length;
    (d) Said each member of said set of models is a said physical block that is essentially thin and flat.

2. The set of interrelated models as disclosed in claim 1 consisting of said physical blocks with distinguishing shapes including:
    (a) a circle whose diameter is one said specified standard unit of length;
    (b) a rectangle whose length is two said specified standard units of length and whose width is one said specified standard unit of length;
    (c) a square wherein the length of each side is three said specified standard units of length;
    (d) a triangle whose base is four said specified standard units of length and whose height is also four said specified standard units of length;
    (e) a circle whose diameter is five said specified standard units of length;
    (f) a cross wherein the full length of each leg of said cross is six specified standard units of length and the width of said each leg is one specified standard unit of length;
    (g) a circle whose diameter is seven said specified standard units of length;
    (h) a diamond wherein the length of the shorter axis is four said specified standard units of length and the length of the longer axis is eight specified standard units of length;
    (i) a rectangle whose length is nine said specified standard units of length and whose width is three said specified standard units of length;
    (j) a rectangle whose length is ten said specified standard units of length and whose width is two said specified standard units of length;
    (k) a rectangle whose length is eleven said specified standard units of length and whose width is one said specified standard unit of length and whose ends are rounded with a radius of essentially on half said specified standard unit of length.

3. The said specified standard unit of length disclosed in claim 1 corresponds to and represents said minimum tonal interval within the musical octave.

* * * * *